United States Patent
Mevenkamp et al.

(10) Patent No.: US 9,561,856 B2
(45) Date of Patent: Feb. 7, 2017

(54) HEAT EXCHANGER, COOLING SYSTEM AND METHOD FOR OPERATING A HEAT EXCHANGER AND A COOLING SYSTEM

(71) Applicant: Airbus Operations GmbH, Hamburg (DE)

(72) Inventors: Christoph Mevenkamp, Toulouse (FR); Georg Muehlthaler, Hamburg (DE); Sebastian Capistran Zambrano, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 788 days.

(21) Appl. No.: 13/666,347

(22) Filed: Nov. 1, 2012

(65) Prior Publication Data

US 2013/0111938 A1 May 9, 2013

Related U.S. Application Data

(60) Provisional application No. 61/555,513, filed on Nov. 4, 2011.

(30) Foreign Application Priority Data

Nov. 4, 2011 (DE) .......................... 10 2011 118 078

(51) Int. Cl.
    *G01K 13/00* (2006.01)
    *B64D 13/06* (2006.01)
    *F28D 9/00* (2006.01)

(52) U.S. Cl.
    CPC ............. *B64D 13/06* (2013.01); *F28D 9/0062* (2013.01); *F28D 9/0093* (2013.01); *B64D 2013/0614* (2013.01); *Y02T 50/44* (2013.01); *Y02T 50/56* (2013.01)

(58) Field of Classification Search
    CPC ............. B64D 13/06; B64D 2013/0614; F28D 9/0062; F28D 9/0093; F28D 1/0408; F28D 1/0417; F28D 1/0426; F28D 1/0452; F28C 1/06; Y02T 50/56
    See application file for complete search history.

(56) References Cited

U.S. PATENT DOCUMENTS

| 6,173,766 | B1* | 1/2001 | Nakamura et al. ........... 165/176 |
| 6,341,648 | B1* | 1/2002 | Fukuoka et al. .............. 165/144 |
| 2005/0006067 | A1* | 1/2005 | Hoglinger et al. ........... 165/140 |

* cited by examiner

*Primary Examiner* — Larry Furdge
(74) *Attorney, Agent, or Firm* — Greer, Burns & Crain, Ltd.

(57) ABSTRACT

A heat exchanger with at least one cooling segment having a first, a second, and a third portion. A first heat carrier flow path, through which a first heat carrier medium flows, extends through the first portion. A second heat carrier flow path, through which a second heat carrier medium flows, extends through the second portion. A first coolant flow path, through which a first coolant medium flows, extends through the third portion. The heat exchanger comprises at least one cooling body, a second coolant medium flowing through a second coolant flow path extending through the cooling body. The first and the second heat carrier flow paths are thermally coupled, respectively, to the first and the second coolant flow path, to discharge heat energy of at least one of the first and the second heat carrier medium to at least one of the first and the second coolant medium.

5 Claims, 5 Drawing Sheets

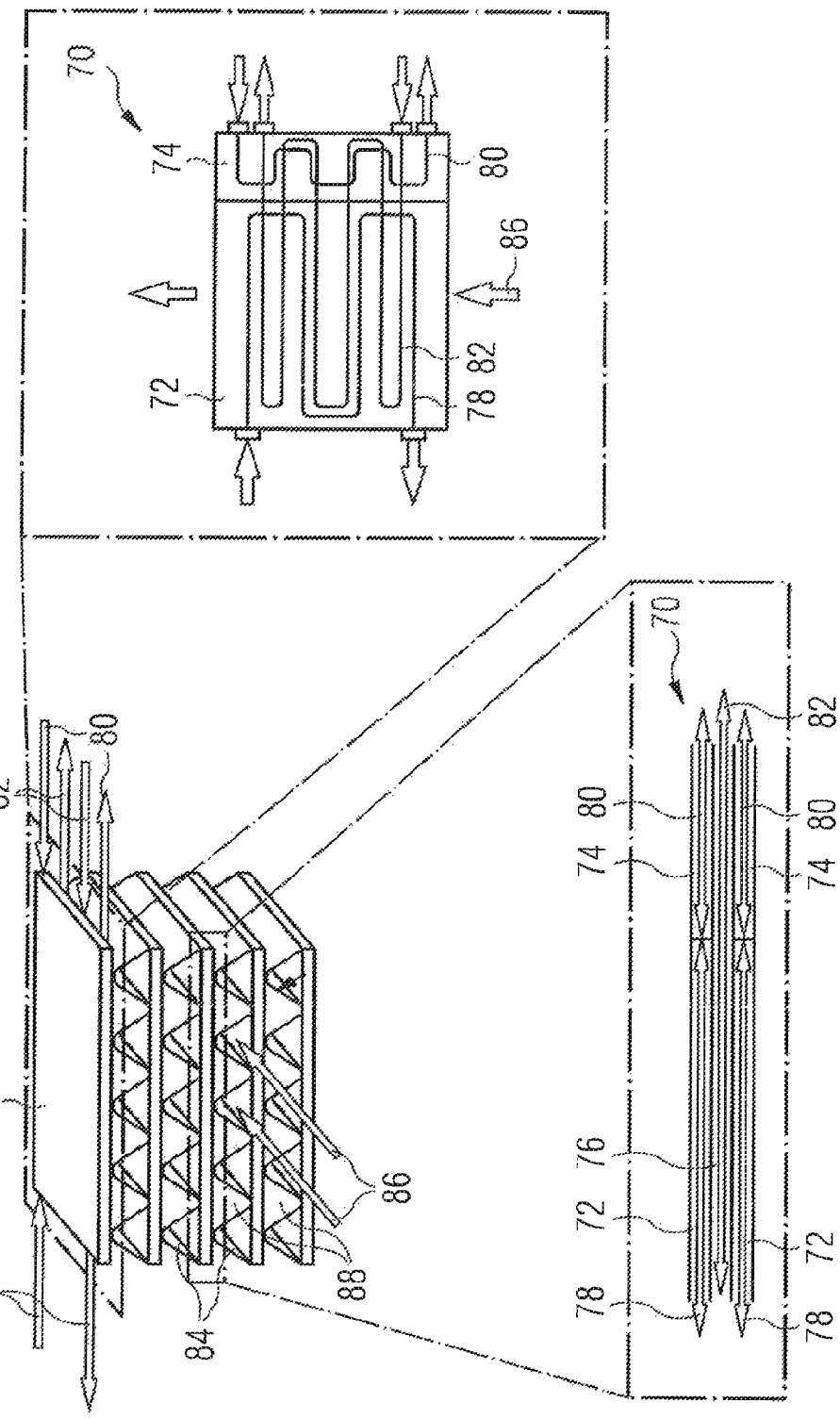
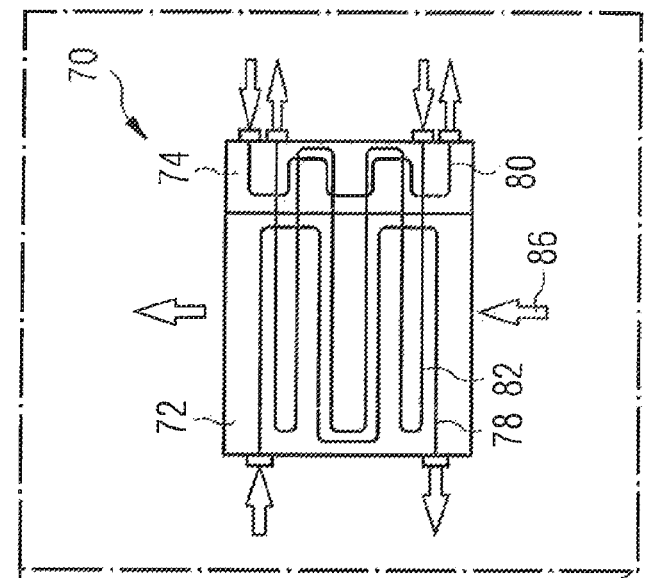
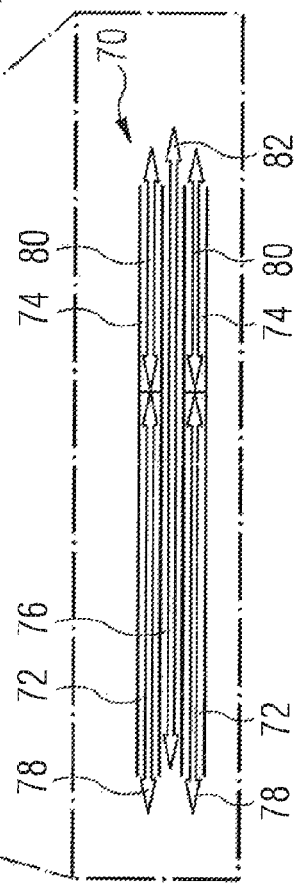
FIG 4a
FIG 4c
FIG 4b

HEAT EXCHANGER, COOLING SYSTEM AND METHOD FOR OPERATING A HEAT EXCHANGER AND A COOLING SYSTEM

This application claims priority of provisional application 61/555,513 filed Nov. 4, 2011 and incorporates the entirety of that application by reference.

BACKGROUND OF THE INVENTION

The invention relates to a heat exchanger, a cooling system and method for operating a heating exchanger and a cooling system.

EP 1 902 950 B1 describes an avionics cooling system for an aircraft. By means of a heat exchanger, an avionics liquid cooling circuit transfers the heat generated by an avionics unit to a fuel flow in a fuel circuit disposed entirely inside a fuel tank. A vapor cooling circuit discharges the heat from the fuel circuit by means of an evaporator. The coolant evaporated inside the vapor cooling circuit is condensed in a ram-air cooler disposed outside of the fuel tank, the heat being transferred from the coolant to the ram air.

In an aircraft air-conditioning system, bleed air required for air-conditioning an aircraft passenger cabin can be drawn from a high-pressure compressor of an engine, and the temperature of the bleed air can be reduced by means of a pre-heat exchanger, before the bleed air is fed to an air-conditioning set for the purpose of further cooling.

As an alternative to such a system architecture based on drawing bleed air from an engine, it is conceivable to have a system architecture of an aircraft air conditioning system in which the air required for air-conditioning a passenger cabin is not drawn from an engine of the aircraft, but is fed into the aircraft from the environment of the aircraft, via an air inlet provided in the aircraft fuselage, and is then compressed and cooled by means of an electrically operated compression and conditioning system. However, the compression and conditioning system generates waste heat, which has to be discharged from the aircraft by means of a suitable cooling system.

SUMMARY OF THE INVENTION

The invention is based on the object of providing a heat exchanger and a cooling system, in particular a cooling system suitable for installation in an aircraft, that are suitable for discharging large amounts of heat, such as those generated, for example, by a compression and conditioning system of an aircraft air-conditioning system. Further, the invention is based on the object of specifying a method for operating such a heat exchanger and such a cooling system.

A heat exchanger according to the invention comprises at least one cooling segment having a first portion, a second portion and a third portion. The heat exchanger further comprises a first heat carrier flow path, which extends through the first portion of the cooling segment and through which a first heat carrier medium can flow, a second heat carrier flow path, which extends through the second portion of the cooling segment and through which a second heat carrier medium can flow, and a first coolant flow path, which extends through the third portion of the cooling segment and through which a first coolant medium can flow. In addition, the heat exchanger comprises at least one cooling body, and at least one second coolant flow path, which extends through the cooling body and through which a second coolant medium can flow. The first and the second heat carrier flow path are thermally coupled, respectively, to the first and the second coolant flow path, in order to discharge heat energy of the first and/or the second heat carrier medium to the first and/or the second coolant medium.

The term "heat carrier medium" is understood here to mean a medium that, as it flows through the heat exchanger, gives off heat energy to a medium referred to here as a "coolant medium," and is thereby cooled. It is understood that a medium that acts as a heat carrier medium as it flows through the heat exchanger can act as a "coolant medium" after emerging from the heat exchanger or before entering the heat exchanger and—with corresponding heating—can give off cooling energy to a device to be cooled. The term "heat carrier flow path" is to be understood to mean a path through which a heat carrier medium can flow. The term "coolant medium," on the other hand, is understood here to mean a medium that, as it flows through the heat exchanger, gives off cooling energy to the heat carrier medium, in order to reduce the temperature of the heat carrier medium. It is understood that a medium that acts as a coolant medium as it flows through the heat exchanger can act as a "heat carrier medium" after emerging from the heat exchanger or before entering the heat exchanger and—with corresponding cooling—can give off heat energy to a cooling device, for example a refrigeration device or the like. The term "coolant flow path" is to be understood to mean a path through which a coolant medium can flow. The terms "heat carrier medium" or "coolant medium," and "heat carrier flow path" or "coolant flow path" thus designate the assignment of a medium to a warm or cold side of a heat energy or a refrigerant energy exchange process in the heat exchanger.

The first, the second and the third portion of the cooling segment may differ from one another, through differing materials or physical properties, and/or may have actual spatial boundaries between one another. If the portions of the cooling segment are actually spatially separated from one another in the cooling segment, the thermal coupling between the heat carrier flow paths and the coolant flow paths may be defined by thermal coupling of the corresponding portions of the cooling segment. It is also conceivable, however, for the first, the second and the third portion to constitute merely "virtual" regions of the cooling segment, which are assigned to the respective flow paths for the purpose of heat energy transfer or refrigerant energy transfer. The thermal coupling between the heat carrier flow paths and the coolant flow paths is then preferably achieved by a direct thermal coupling of the corresponding flow paths. The first and the second heat carrier flow path and the first and the second coolant flow path are preferably realized so as to be fluidically independent, i.e. fluidically separate from one another.

The four-way heat exchanger according to the invention has the advantage that two heat carrier flow paths are thermally coupled, respectively, to two coolant flow paths, within one structural unit. Two separate heat exchangers are therefore not required in order to discharge heat energy from the first and the second heat carrier medium. The heat exchanger thus saves space and weight. Further, it is then possible for a heat carrier medium flowing through a heat carrier flow path to be cooled, even when there is no coolant medium flowing through one coolant flow path, i.e., only one coolant medium is available for cooling the heat carrier medium flowing through the heat carrier flow path. Conversely, if necessary, two coolant media may also be used to cool only one heat carrier medium. Finally, it is also possible for the heat exchanger to be operated with only one heat carrier medium and only one coolant medium. The heat exchanger can thus be operated in a particularly flexible manner and is suitable, in particular, for use in an aircraft air-conditioning system, for the purpose of discharging waste heat from an electrically operated compression and conditioning system.

The first, the second and the third portion of the cooling segment may be disposed in a sandwich-type structure. Preferably, the first and the second portion each extend in at least one first plane. The third portion may extend in a plane that extends substantially parallel to the first plane. Such a disposition enables the first and the second portion of the cooling segment to be thermally coupled to the third portion of the cooling segment without difficulty, and in a manner that saves structural space.

In a preferred embodiment of the heat exchanger, the first and the second portion extend, respectively, in the first plane and in a second plane that is at a distance from the first plane and that extends substantially parallel to the first plane. The third portion may then extend in a third plane that is disposed between the first and the second plane and that extends substantially parallel to the first and/or the second plane. Such a configuration enables the first and the second portion of the cooling segment to be thermally coupled to the third portion of the cooling segment in an optimized manner. Further, in such a design of the cooling segment, the thermal coupling of the first and the second portion of the cooling segment to the cooling body, i.e., to the coolant flow path extending through the cooling body, can be realized in a simple manner. For example, this thermal coupling may be achieved by means of a surface of the first and the second portion of the cooling face, which surface faces away from the third portion of the cooling segment.

The first and the second portion of the cooling segment may be designed in such a way that a ratio between a parameter that is characteristic of the heat transfer properties of the first portion and a parameter that is characteristic of the heat transfer properties of the second portion corresponds to a ratio between the heat energy of the first heat carrier medium to be discharged via the first portion, when the heat exchanger is in normal operation, and the heat energy of the second heat carrier medium to be discharged via the second portion, when the heat exchanger is in normal operation. As a parameter that is characteristic of the heat transfer properties of a portion of the cooling segment, it is possible to use a face, a surface and/or a spatial volume of the respective portion, and/or a physical quantity assigned to the first or the second portion of the cooling segment, such as, for example, the specific heat capacity, the heat transfer coefficient and/or the mass of the respective portion. A normal operation of the heat exchanger is understood here to mean an operating situation of the heat exchanger in which the heat exchanger normally has to work, for example when an aircraft is in flight, and/or an operating situation for which the heat exchanger has been design-rated.

The cooling body may comprise a corrugated sheet-type louver fin component. The at least one second coolant flow path may then extend along a flute of this louver fin component. Air, in particular ram air and/or external air, as a second coolant medium, can then flow particularly easily through the second coolant flow path.

A cooling system according to the invention comprises a heat exchanger described above. Further, the cooling system comprises a first heat carrier circuit, through which a first heat carrier medium can flow, the first heat carrier flow path constituting a portion of the first heat carrier circuit, and comprises a second heat carrier circuit, through which a second heat carrier medium can flow, the second heat carrier flow path constituting a portion of the second heat carrier circuit, and comprises a coolant circuit, through which a first coolant medium can flow, the first coolant flow path constituting a portion of the coolant circuit. In addition, the cooling system comprises a ram-air duct, through which ram air can flow, as a second coolant medium, the heat exchanger being disposed in the ram-air duct in such a way that ram air can flow through the second coolant flow path of the heat exchanger. The first and the second heat carrier circuit, the coolant circuit and the ram-air duct are preferably realized so as to be fluidically independent, i.e., fluidically separate from one another.

The first heat carrier medium may be a two-phase or gaseous heat carrier medium. As it flows through the first heat carrier circuit, which may be thermally coupled to an intake-air line for feeding intake air into an aircraft passenger cabin, in order to discharge heat energy from the intake air, the first heat carrier medium may undergo a vapor-compression refrigeration process. The second heat carrier medium may be a liquid or a two-phase heat carrier medium. The second heat carrier circuit, through which the second heat carrier medium can flow, may be thermally coupled to at least one electrical/electronic component, for example power electronics, an electrically operated compressor, a compressor motor or its voltage transformer and/or an electrically operated compression and conditioning system, in order to discharge heat energy from the electrical/electronic component. The first coolant medium may be a liquid, two-phase or gaseous coolant medium. The first coolant medium may undergo a vapor-compression refrigeration process as it flows through the coolant circuit.

The cooling system may further comprise a refrigeration device. The refrigeration device may be thermally coupled to the coolant circuit and be set up to discharge heat energy from the first coolant medium. The cooling system may additionally comprise a sensor, which is disposed in the region of the refrigeration device and which is set up to acquire a signal that is representative of the capacity utilization state of the refrigeration device. In addition, the cooling system may comprise a control device, which is set up to control the ram-air flow fed to the heat exchanger. In particular, the control device may be connected to the sensor disposed in the region of the refrigeration device, and may be set up to control the ram-air flow fed to the heat exchanger, in dependence on the signal, acquired by the sensor, that is representative of the capacity utilization state of the refrigeration device. In particular, the control device may be set up to control the air-ram flow fed to the heat exchanger in such a way that ram air is fed to the heat exchanger only to the extent to which the refrigeration device alone is incapable of taking up the heat energy to be discharged out of the first and the second heat carrier circuit. Such a control makes it possible to minimize the ram-air flow through the ram-air duct, and thereby to minimize the aerodynamic losses resulting from the operation of the ram-air duct. This enables the fuel consumption to be reduced. A mass flow regulator located in the region of the ram-air duct, for example, may be used to control the ram-air flow through the heat exchanger.

Additionally or alternatively, the cooling system may comprise a compression and conditioning system. The compression and conditioning system and/or the first heat carrier circuit may be thermally coupled to an intake-air line for feeding intake air into a passenger cabin. The compression and conditioning system and/or the first heat carrier circuit may be set up to discharge heat energy from intake air flowing through the intake-air line. The cooling system may comprise a sensor disposed in the region of the first heat carrier circuit. The sensor may be set up to acquire a signal that is representative of the capacity utilization state of the first heat carrier circuit. In addition, the cooling system may comprise a control device, which is set up to control the compression and conditioning system. Preferably, the control device may be set up to control a feed-air flow fed to the compression and conditioning system for the purpose of cooling.

In particular, the control device may be connected to the sensor disposed in the region of the first heat carrier circuit and/or to the sensor disposed in the region of the refrigeration device. The control device may be set up to control the compression and conditioning system in dependence on the signal that is acquired by the sensor disposed in the region of the first heat carrier circuit and that is representative of the capacity utilization state of the first heat carrier circuit, and/or in dependence on the signal that is acquired by the sensor disposed in the region of the refrigeration device and that is representative of the capacity utilization state of the refrigeration device. Preferably, the control device may be set up to control the intake air flow fed to the compression and conditioning system in dependence on the signal that is representative of the capacity utilization state of the first heat carrier circuit, and/or in dependence on the signal that is representative of the capacity utilization state of the refrigeration device. Preferably, the control device may be set up to control the compression and conditioning system in such a way that the compression and conditioning system discharges heat energy from the intake air only to the extent to which the first heat carrier circuit and/or the refrigeration device are/is incapable of discharging the heat energy to be discharged from the intake air. Preferably, the control device may be set up to control the intake air fed to the compression and conditioning system in such a way that intake air, for discharging heat energy, is fed to the compression and conditioning system only to the extent to which the first heat carrier circuit and/or the refrigeration device are/is incapable of discharging the heat energy to be discharged from the intake air for the purpose of air-conditioning the passenger cabin.

The cooling system may be integrated into an aircraft air-conditioning system, which comprises at least one air inlet for feeding external air into the aircraft air-conditioning system. Further, the aircraft air-conditioning system may comprise an electrically operated compression and conditioning system, which is set up to compress and/or cool the external air fed into the aircraft air-conditioning system via the air inlet. The air conditioned by means of the electrically operated compression and conditioning system can be used to air-condition an aircraft passenger cabin.

In a method, according to the invention, for operating a heat exchanger, a first heat carrier medium is routed through a first heat carrier flow path, which extends through a first portion of a cooling segment of the heat exchanger. A second heat carrier medium is routed through a second heat carrier flow path, which extends through a second portion of the cooling segment of the heat exchanger. A first coolant medium is routed through a first coolant flow path, which extends through a third portion of the cooling segment of the heat exchanger. A second coolant medium, finally, is routed through a second coolant flow path, which extends through a cooling body of the heat exchanger. The first and the second heat carrier flow path are thermally coupled, respectively, to the first and the second coolant flow path, in order to discharge heat energy of the first and/or the second heat carrier medium to the first and/or the second coolant medium.

When the heat exchanger is in normal operation, heat energy of the first heat carrier medium can be discharged via the first portion of the cooling segment, and heat energy of the second heat carrier medium can be discharged via the second portion of the cooling segment. A ratio between the discharged heat energy of the first heat carrier medium and the discharged heat energy of the second heat carrier medium preferably corresponds to the ratio between a parameter that is characteristic of the heat transfer properties of the first portion and a parameter that is characteristic of the heat transfer properties of the second portion.

In a method for operating a cooling system, in particular intended for installation in an aircraft, a first heat carrier medium is routed through a first heat carrier circuit, the first heat carrier flow path of a heat exchanger described above constituting a portion of the first heat carrier circuit. A second heat carrier medium is routed through a second heat carrier circuit, the second heat carrier flow path of a heat exchanger described above constituting a portion of the second heat carrier circuit. A first coolant medium is routed through a coolant circuit, the first coolant flow path of a heat exchanger described above constituting a portion of the coolant circuit. Finally, ram air, which flows through a ram-air duct, is routed, as a second coolant medium, through a second coolant flow path of a heat exchanger described above.

The first heat carrier medium may be a two-phase or a gaseous heat carrier medium. The first heat carrier circuit may be thermally coupled to an intake-air line for feeding intake air into a passenger cabin, and may discharge heat energy from intake air flowing through the intake-air line. The second heat carrier medium may be a liquid or a two-phase heat carrier medium. The second heat carrier circuit may be thermally coupled to an electrical and/or electronic component and discharge heat energy from the electrical/electronic component. The first coolant medium may be a liquid, two-phase or gaseous coolant medium.

In the method, according to the invention, for operating a cooling system, in particular intended for installation in an aircraft, heat energy may be discharged from the first coolant medium by means of a refrigeration device thermally coupled to the coolant circuit. Further, a signal that is representative of the capacity utilization state of the refrigeration device may be acquired by means of a sensor disposed in the region of the refrigeration device. The ram-air flow fed to the heat exchanger may be controlled, by means of a control device connected to the sensor, in dependence on the signal, acquired by the sensor that is representative of the capacity utilization state of the refrigeration device.

An aircraft according to the invention has a heat exchanger described above and/or a cooling system described above.

Insofar as a method or individual steps of a method for operating a heat exchanger and/or for operating a cooling system is/are described in this description, the method or individual steps of the method can be executed by a correspondingly realized apparatus. The same applies, analogously, to the explanation of the manner of operation of an apparatus that executes method steps, even if the method steps are not explicitly designated as such.

Otherwise, any combination of the features, listed here, of a heat exchanger and/or a cooling system or a method for operating a heat exchanger and/or a cooling system is conceivable. Also conceivable is any combination of the features, described in the following, explained in connection with the figures.

BRIEF DESCRIPTION OF THE DRAWINGS

The invention is explained more fully in the following with reference to the appended schematic drawings, of which:

FIG. 4a shows a schematic representation of a heat exchanger according to FIG. 3, in a perspective view, FIG. 4b shows a schematic representation of a cooling segment of the heat exchanger according to FIG. 4a, in cross section, FIG. 4c shows a schematic representation of a cooling segment of the heat exchanger according to FIG. 4a, in longitudinal section.

DETAILED DESCRIPTION OF THE PREFERRED EMBODIMENTS

Figure 1:
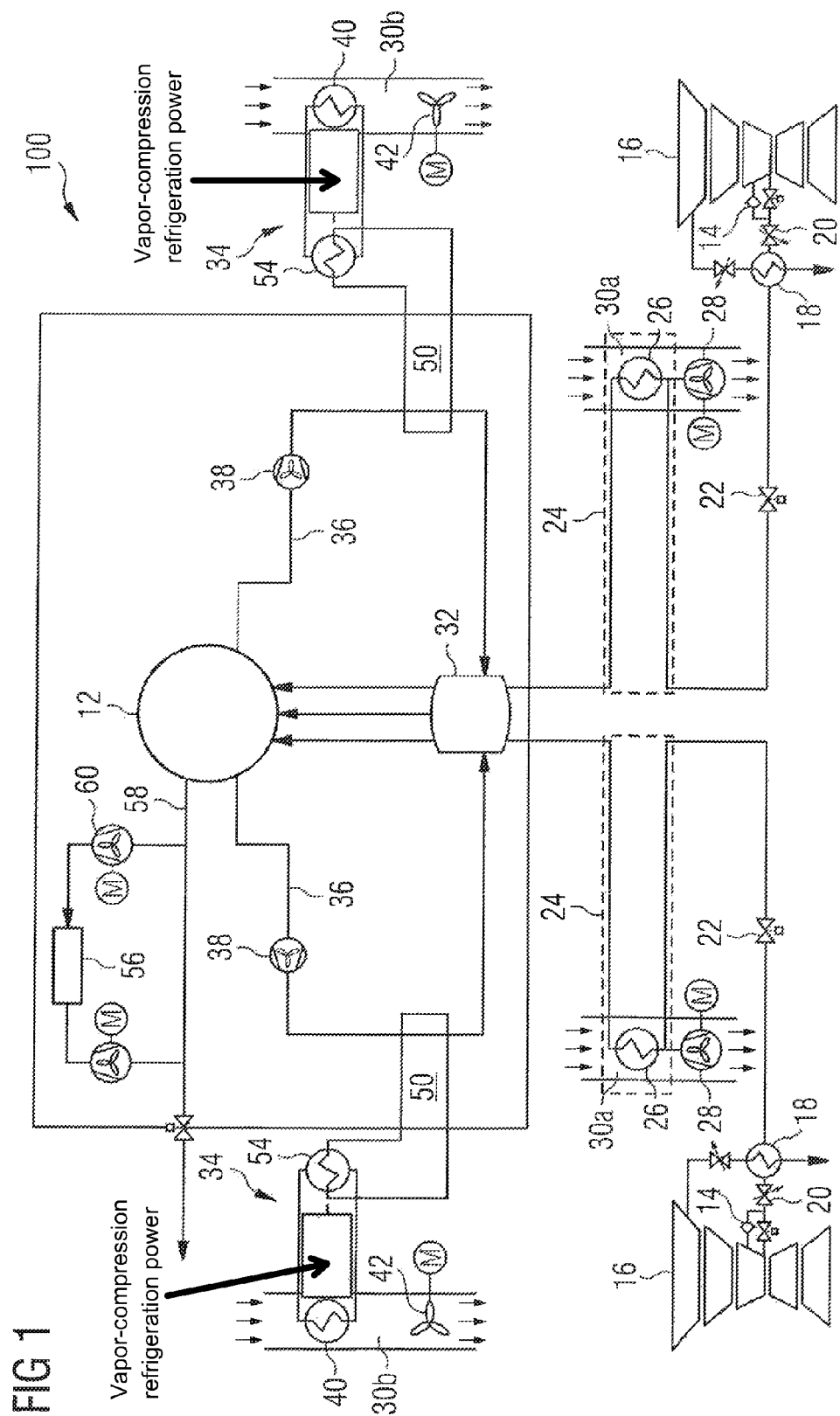
FIG. 1 shows a schematic representation of an aircraft air-conditioning system, with a cooling system integrated into the aircraft air-conditioning system.
Figure 2:
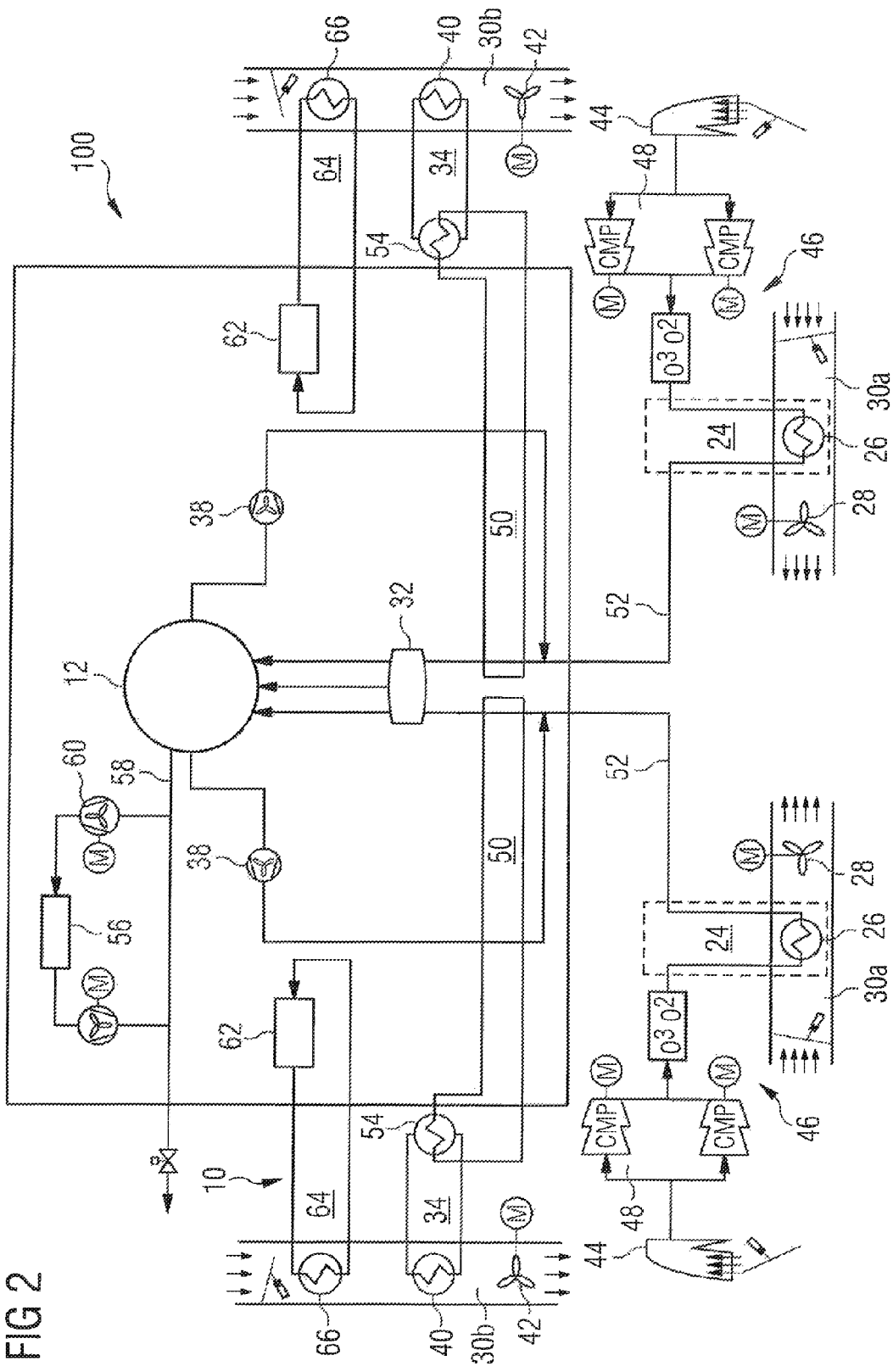
FIG. 2 shows a schematic representation of a further aircraft air-conditioning system, with a cooling system integrated into the aircraft air-conditioning system.
Figure 3:
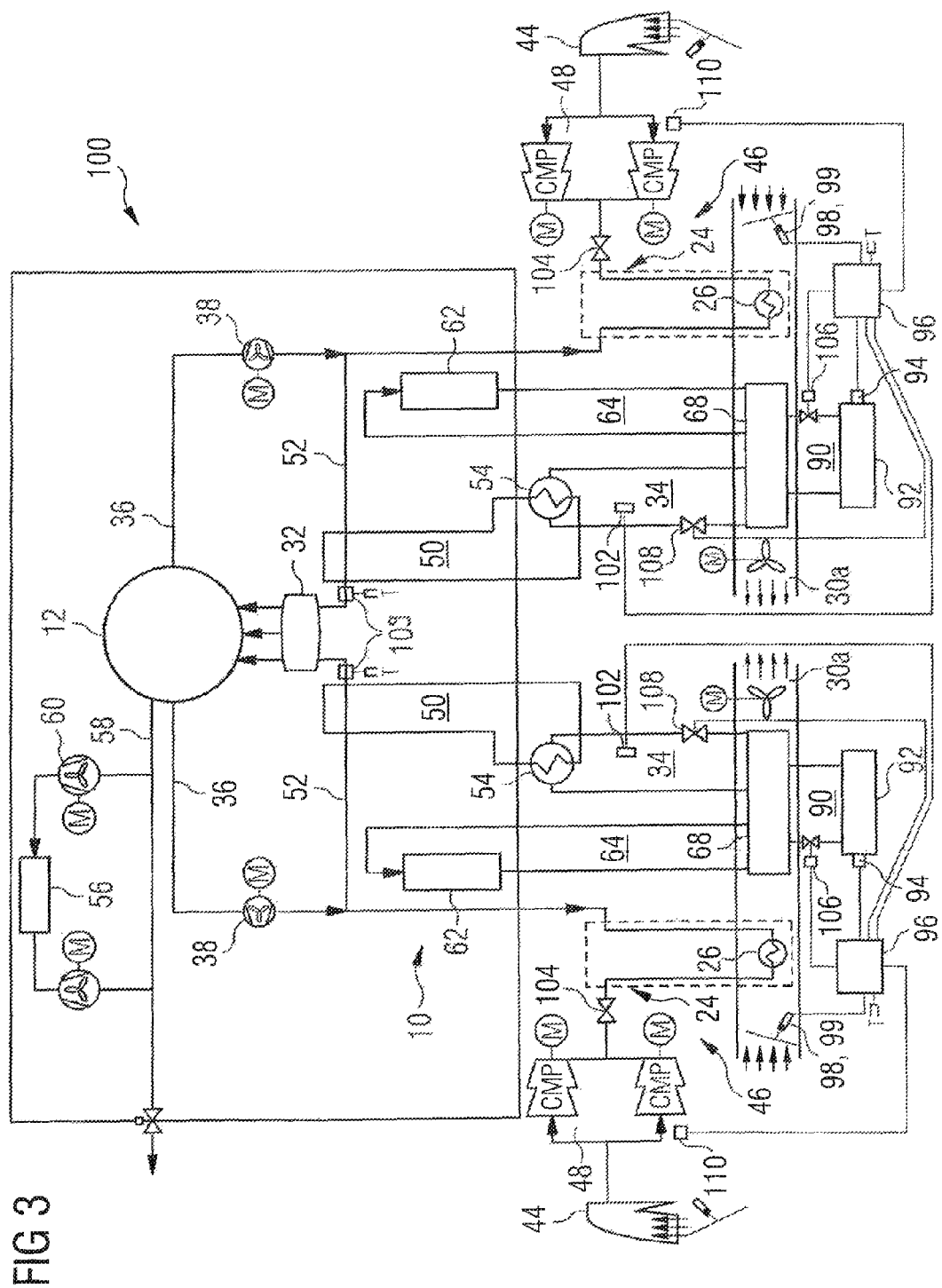
FIG. 3 shows a schematic representation of a further aircraft air-conditioning system, with a cooling system integrated into the aircraft air-conditioning system.

In FIGS. 1 to 3, an aircraft air-conditioning system is denoted in general by 100, and a cooling system integrated into the aircraft air-conditioning system is denoted in general by 10. The aircraft air-conditioning system 100 serves, amongst other things, to pressurize and air-condition an aircraft passenger cabin 12. In the figures, elements that are the same or that have the same function are denoted by the same references.

FIG. 1 shows an aircraft air-conditioning system 100. When the aircraft air-conditioning system 100 is in operation, bleed air is drawn from a high-pressure compressor 14 of an engine 16. The temperature of the bleed air can be reduced by means of a pre-heat exchanger 18. A regulating valve 20 regulates the pressure of the bleed air. A further regulating valve 22 regulates the mass flow of the bleed air, which is subsequently fed to an air-conditioning set 24. The air-conditioning set 24 operates on the basis of an air-assisted refrigeration process, in which the pressurized bleed air is expanded in a cooling turbine and is thus cooled. The waste heat produced as a result is discharged via a ram-air duct 30a, by means of a heat exchanger 26. A fan 28 disposed in the ram-air duct 30a serves, if necessary, for example when the aircraft is on the ground, to convey air out of the aircraft environment, through the ram-air duct 30a. The bleed air conditioned in the air-conditioning set 24, on the other hand, is directed into the passenger cabin 12 for the purpose of pressurizing and air-conditioning, via a mixer 32, in which the conditioned bleed air is mixed with recirculation air from the passenger cabin 12.

In the case of very high power outputs of the air-conditioning set 24, ice formation may occur in the lines of the aircraft air-conditioning system 100 through which the bleed air flows. This, in turn, can result in malfunctions of the aircraft air-conditioning system 100. In order to relieve the air-conditioning set and thereby prevent or minimize formation of ice in the lines of the aircraft air-conditioning system 100 through which the bleed air flows, a circuit 34 operating on the basis of a vapor-compression refrigeration process is used. The circuit 34 also serves to increase the redundancy of the air conditioning in the aircraft air-conditioning system 100 and the overall efficiency of the aircraft air-conditioning system 100. However, equipping the aircraft air-conditioning system 100 with the circuit 34 also involves more weight and an increased amount of installation work.

A first medium flows through the circuit 34, which circuit is used to cool recirculation air, which is drawn out of the passenger cabin 12 via a transfer circuit 50, and which is conveyed through a recirculation air line 36 by means of a fan 38. The thermal coupling between the circuit 34 and the transfer circuit 50 is produced by a heat exchanger 54. A further heat exchanger 40 is disposed in the circuit 34. The heat exchanger 40 is positioned in a further ram-air duct 30b. A fan 42 disposed in the further ram-air duct 30b serves, if necessary, for example when the aircraft is on the ground, to convey air out of the aircraft environment, through the further ram-air duct 30b. As it flows through the circuit 34, the first medium is transformed, in the heat exchanger 54, from the liquid to the gaseous state of aggregation, giving off cooling energy to the recirculation air flowing through the recirculation air line 36. In the heat exchanger 40, on the other hand, the heated first medium is cooled by transfer of cooling energy from the ram air flowing through the further ram-air duct 30b, and converted from the gaseous state of aggregation back into the liquid state of aggregation.

The aircraft air-conditioning systems 100 represented in FIGS. 2 and 3 differ from the aircraft air-conditioning system 100 according to FIG. 1 in that their system architecture is not based on the drawing of bleed air from an engine. Rather, in the case of the aircraft air-conditioning systems 100 shown in FIGS. 2 and 3, the air required for air-conditioning the passenger cabin 12 is fed out of the aircraft environment, via an air inlet 44 provided in the aircraft fuselage, into the aircraft, i.e., into the aircraft air-conditioning system 100, and is then compressed and cooled by means of an electrically operated compression and conditioning system 46.

The compression and conditioning system 46 comprises an electrically operated compressor 48 and, for example, an air-conditioning set 24 already described in connection with FIG. 1.

Downstream of the compression and conditioning system 46, the intake air flowing through an intake-air line 52 is cooled through a circuit 34. Unlike the aircraft air-conditioning system 100 according to FIG. 1, the circuit 34 in the aircraft air-conditioning systems 100 represented in FIGS. 2 and 3 is thus not used to cool recirculation air extracted from the passenger cabin 12. Rather, the circuit 34 constitutes a part of a cooling system 10, and is thermally coupled to the intake-air line 52 vie the transfer circuit 50. The intake air is finally directed into the passenger cabin 12 for the purpose of pressurizing and air-conditioning, via the mixer 32, in which the intake air is mixed with recirculation air from the passenger cabin 12.

An avionics system 56 of the aircraft is cooled by means of cabin exhaust air. A cabin exhaust-air line 58 and a fan 60 are provided for this purpose. The fan 60 is set up to draw cabin exhaust air out of the passenger cabin 12 and feed it to the avionics system 56 for cooling.

In the case of the aircraft air-conditioning systems 100 shown in FIGS. 2 and 3, it is necessary for electronic components 62 of the compression and conditioning system 46 to be cooled sufficiently. An electronic component 62 of the compression and conditioning system 46 that is to be cooled can be, for example, the compressor 48 of the compression and conditioning system 46, the motor of the compressor 48, its electrical voltage transformer, or another electronic component 62 of the compression and conditioning system 46, realized as power electronics. Power electronics are characterized by a power consumption of some 10 kW (for instance 70-90 kW). However, the avionics system 56 is realized so as to be separate from the electronic component 62 and, as described above, is cooled separately with cabin exhaust air.

A second circuit 64 is provided to cool the at least one electronic component 62. The second circuit 64 is assigned to the cooling system 10, and is thermally coupled to at least one of the at least one electronic components 62. Heat energy generated by the electronic component(s) 62 can thus be discharged by means of the second circuit 64. A second medium, which is in the liquid or two-phase state of aggregation, flows through the second circuit 64.

In the case of the aircraft air-conditioning system 100 shown in FIG. 2, the first and the second circuit 34, 64 each discharge heat energy via a separate heat exchanger 40, 66. The heat exchangers 40, 66 are positioned, spatially separated from one another, in the further ram-air duct 30*b*. Accordingly, in the case of the aircraft air-conditioning system 100 according to FIG. 2, three heat exchangers 26, 40, 66 (per aircraft side) are accommodated in two ram-air ducts 30*a*, 30*b*. This configuration requires a large amount of installation work and has a large installation volume and a high weight.

Figure 5:
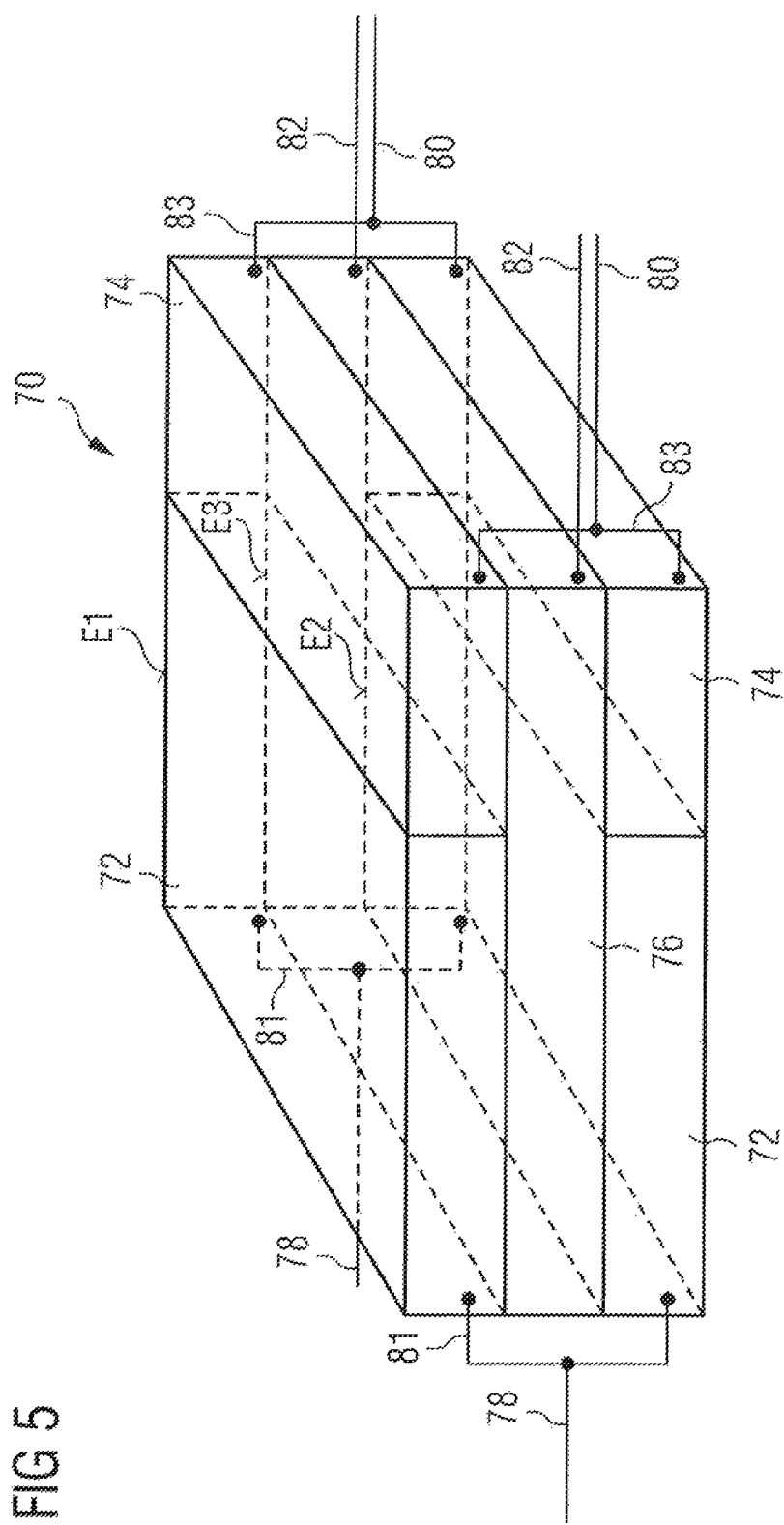
FIG. 5 shows a further schematic representation of the heat exchanger according to FIG. 3, in a perspective view.

In comparison with the aircraft air-conditioning system 100 shown in FIG. 2, the aircraft air-conditioning system 100 illustrated in FIG. 3 is distinguished by a multifunctional heat exchanger 68. The heat exchanger 68 is represented in greater detail in FIGS. 4*a* to 4*c* and 5. The heat exchanger 68 comprises at least one cooling segment 70. Five cooling segments 70 are shown, by way of example, in FIG. 4*a*. It can be seen in FIGS. 4*b*, 4*c* and 5 that each cooling segment 70 comprises a first portion 72, a second portion 74 and a third portion 76. A first heat carrier flow path 78, through which a first heat carrier medium can flow, extends through the first portion 72. A second heat carrier flow path 80, through which a second heat carrier medium can flow, extends through the second portion 74. A first coolant flow path 82, through which a first coolant medium can flow, extends through the third portion 76.

The portions 72-76 need not necessarily differ from one another, through differing materials or physical properties, or have actual boundaries between one another. Rather, the portions 72-76 represent spatial regions of the cooling segment 70 that are assigned to the differing heat carrier flow paths 78, 80 and the first coolant flow path 82 for the purpose of heat energy transfer and refrigerant energy transfer respectively.

The first, the second and the third portion 72-76 of the cooling segment 70 each adjoin one another, and are disposed in a sandwich-type structure in such a way that the first and the second portion 72, 74 extend, respectively, in a first plane E1 and in a second plane E2 that is at a distance from the first plane E1 and that extends substantially parallel to the first plane E1. The third portion 76, on the other hand, extends in a third plane that is disposed between the first and the second plane E1, E2 and that extends substantially parallel to the first and/or the second plane E1, E2. Accordingly, the first and the second portion 72, 74 together constitute the underside and the top side of the cooling segment 70, while the third portion 76 is disposed between the underside and the top side of the cooling segment 70.

In order that the first and the second heat carrier flow path 78, 80 can each extend along both the underside of the cooling segment 70 and the top side of the cooling segment 70, two distributors 81, 83 are provided per cooling segment 70. The distributors 81, 83 are set up to split the first and the second heat carrier flow path 78, 80, upstream of the first and the second portion 72, 74 of the cooling segment 70, into two flow path portions, which then extend through the first and the second portion 72, 74 of the cooling segment 70. Further, the distributors 81, 83 are set up to recombine the flow path portions downstream of the first and the second portion 72, 74 of the cooling segment 70.

Further, the first and the second portion 72, 74 of the cooling segment 70 are designed in such a way that a ratio, between a surface of the first portion 72 of the cooling segment 70 that adjoins the third portion 76 of the cooling segment 70, and a surface of the second portion 74 of the cooling segment 70 that adjoins the third portion 76 of the cooling segment 70, corresponds to a ratio between the heat energy of the first heat carrier medium to be discharged via the first portion 72, when the heat exchanger 68 is in normal operation, and the heat energy of the second heat carrier medium to be discharged via the second portion 74, when the heat exchanger 68 is in normal operation.

The heat exchanger 68 further comprises at least one cooling body 84. Four such cooling bodies 84 are shown, by way of example, in FIG. 4*a*. As shown by FIG. 4*a*, the cooling body 84 comprises a corrugated sheet-type louver fin component. At least one second coolant flow path 86, through which a second coolant medium can flow, extends through the cooling body 84. It can be seen in FIG. 4*a*, by way of example, that a plurality of second coolant flow paths 86 extend along the cooling body 84, through flutes 88 of the louver fin component.

The first and the second heat carrier flow path 78, 80 are thermally coupled, respectively, to the first and the second coolant flow path 82, 86, in order to discharge heat energy of the first and/or the second heat carrier medium to the first and/or the second coolant medium. The cooling body 84 and the cooling segment 70 can be connected to one another, for example, by friction stir welding.

The disposition of the first coolant flow path 82 inside the cooling segment 70 on the so-called "liquid side" of the cooling segment 70 and the disposition of the second coolant flow path 86 in the cooling body 84 on the so-called "air side" of the cooling segment 70 allow the heat carrier flow paths 78, 80 giving off heat energy each to have a heat transfer to the coolant flow paths 82, 86. In this sense, the heat exchanger 68 can be referred to as a four-way heat exchanger.

It can be seen in FIG. 3 how the heat exchanger 68, or the cooling system 10 comprising the heat exchanger 68, is integrated into the aircraft air-conditioning system 100. The first heat carrier flow path 78 constitutes a portion of the first circuit 34, in which the first medium is accommodated, such that the first medium can flow through the first heat carrier flow path 78. In the vicinity of the heat exchanger 68, the first circuit 34 acts as a heat carrier circuit, and the first medium thus constitutes a first heat carrier medium, which gives off heat energy as it flows through the heat exchanger 68. The second heat carrier flow path 80 constitutes a portion of the second circuit 64, in which the second medium is accommodated, such that the second medium can flow through the second heat carrier flow path 80. In the vicinity of the heat exchanger 68, the second circuit 64 also acts as a heat carrier circuit, and the second medium thus constitutes a second heat carrier medium, which gives off heat energy as it flows through the heat exchanger 68.

The first coolant flow path 82 constitutes a portion of a coolant circuit 90, in which a liquid, two-phase or gaseous first coolant medium is accommodated, such that the first coolant medium can flow through the first coolant flow path 82. The coolant circuit 90 is thermally coupled to at least one refrigeration device 92, which is set up to discharge heat energy from the first coolant medium, for the purpose of cooling the first coolant medium. Ram air, as a second coolant medium, can flow through the at least one second coolant flow path 86 realized in the cooling body 84. Consequently, the heat exchanger 68 is disposed in the ram-air duct 30a in such a way that ram air can flow through the second coolant flow path 86.

In the case of such an integration of the heat exchanger 68, or of the cooling system 10, into the aircraft air-conditioning system 100, although the first and the second circuit 34, 64, the coolant circuit 90 and the ram-air duct 30a are realized so as to be fluidically independent of one another, they are nevertheless each thermally coupled to one another via the heat exchanger 68. There is thereby provided a physical integration concept that connects the first circuit 34, giving off heat energy in the region of the heat exchanger 68 and, on its "cold side", serving to air-condition the passenger cabin 12, and the second circuit 64, giving off heat energy in the region of the heat exchanger 68 and, on its "cold side", discharging waste heat from the electronic component 62, to the coolant circuit 90, taking up heat energy in the region of the heat exchanger 68 and, on its "warm side", connected to the refrigeration device 92, and the ram-air duct 30a, taking up heat energy. Since, in addition to the ram-air duct 30a, the refrigeration device 92 is also suitable for discharging waste heat from the aircraft, the refrigeration device 92 can be understood as an alternative heat sink. In the case of the aircraft air-conditioning system 100 according to FIG. 3, only two heat exchangers 26, 68 (per aircraft side) are accommodated in a single ram-air duct 30a. This saves installation volume and reduces the amount of installation work and the weight.

The cooling system 10 further comprises a sensor 94, which is disposed in the region of the refrigeration device 92 and which is set up to acquire a signal that is representative of the capacity utilization state of the refrigeration device 92. A control device 96 connected to the sensor 94 is set up to control the ram-air flow fed to the heat exchanger 68, i.e., to control the ram-air flow flowing through the ram-air duct 30a, in dependence on the signal, acquired by the sensor 94, that is representative of the capacity utilization state of the refrigeration device 92. The control of the ram-air flow fed to heat exchanger 68 is effected by means of a mass flow regulator 98. The mass flow regulator 98 comprises a sensor 99, which is set up to acquire a signal that is representative of the ram-air mass flow flowing through the ram-air duct 30a, and to transmit the signal to the control device 96. The control device 96 controls the mass flow of ram air fed to the heat exchanger 68 in such a way that ram air is fed to the heat exchanger 68 only to the extent to which the refrigeration device 92 alone is incapable of taking up the heat energy to be discharged out of the first and the second circuit 34, 64.

Accordingly, the control device 96 operates on the basis of a regulating strategy, the purpose of which is to minimize the ram-air flow through the heat exchanger 68, and therefore through the ram-air duct 30a.

The cooling system 10 further comprises a sensor 102 disposed in the region of the first circuit 34, which sensor is set up to acquire a signal that is representative of the capacity utilization state of the first circuit 34. The signal that is representative of the capacity utilization state of the first circuit 34 can be, for example, the rotational speed or the operating voltage of a motor assigned to the first circuit 34, or of a pump assigned to the circuit 34. However, the signal that is representative of the capacity utilization state of the first circuit 34 can also be a temperature of the medium accommodated in the first circuit 34, shortly before entering the heat exchanger 68.

The control device 96 is further connected to the sensor 102 and to the compression and conditioning system 46, and is set up to control the compression and conditioning system 46 in dependence on the signal, acquired by the sensor 94, that is representative of the capacity utilization state of the refrigeration device 92, and in dependence on the signal, acquired by the sensor 102, that is representative of the capacity utilization state of the circuit 34. The control of the compression and conditioning system 46 is effected, for example, by means of a regulating valve 104 in the compression and conditioning system 46, which regulating valve is set up to control the intake air fed to the compression and conditioning system 46 for the purpose of cooling. The control device 96 controls the compression and conditioning system 46 in such a way that the compression and conditioning system 46 discharges heat energy from the intake air only to the extent to which the first circuit 34, in cooperation with the refrigeration device 92, is incapable of discharging the heat energy to be discharged from the intake air.

The control device 96 can therefore operate on the basis of a regulating strategy, the purpose of which, on the one hand, is to minimize the ram-air flow through the ram-air duct 30a, and the purpose of which, on the other hand, is to reduce the capacity utilization of the compression and conditioning system 46: when, according to the sensors 94 and 102, the capacities of the refrigeration device 92 and the first circuit 34 are not yet fully utilized, the control device 96, by means of the regulating valve 104, reduces the intake air fed to the compression and conditioning system 46 for the purpose of cooling, in such a way that the compression and conditioning system 46 is relieved. Additionally or alternatively, the control device 96, by means of the mass flow regulator 98, reduces the ram-air flow flowing through the ram-air duct 30a.

Additionally or alternatively, the control device 96 can also operate on the basis of the following two-stage regulating strategy:

In a first stage I, the regulation is effected as follows: (Ia) In normal operation, the circuit 34 and the compression and conditioning system 46 are operated in such a way that their power requirement is minimal and, in addition, all of the heat energy to be removed from the circuit 34 is discharged in the refrigeration device 92. The control device 96 in this case controls the mass flow regulator 98 in such a way that the ram-air flow in the ram-air duct 30a is just sufficient to discharge the heat energy to be discharged from the heat exchanger 26 of the cooling set 24. (Ib) Should the sensor 94 acquire a signal that is representative of the capacity of the refrigeration device 92 being insufficient to discharge the heat energy to be removed from the circuit 34, the control device 96 controls the mass flow regulator 98 in such a way that the ram-air flow in the ram-air duct 30a is sufficient, together with the refrigeration device 92, to discharge the heat energy to be removed from the circuit 34.

In a second stage II, the regulation is effected as follows: If the sensor 94 acquires a signal that is representative of the refrigeration device 92 having greater capacities than are necessary to effect or maintain the operation in Ia of stage I, the control unit 96 reduces the capacity utilization of the compression and conditioning system 46 and increases the capacity utilization of the circuit 34 for as long as the heat energy to be additionally discharged in the heat exchanger 68 can be discharged by the refrigeration device 92. Owing to the lesser amount of heat energy to be discharged from the heat exchanger 26, the mass flow regulator 98 can be closed further, such that less ram-air resistance is produced. Owing to the thermal coupling of the compression and conditioning system 46 and the circuit 34 via the circuit 50 and the intake air in the intake-air line 52, it is nevertheless ensured that the passenger cabin 12 receives the intake air with the temperature cooled to the necessary extent. For the purpose of regulating the mass flow of the first coolant medium in the coolant circuit 90, the cooling system 10 can comprise a regulating or mass flow valve 106. The regulating or mass flow valve 106 can be connected to the control unit 96. For the purpose of regulating the mass flow of the medium in the circuit 34, the cooling system 10 can comprise a regulating or mass flow valve 108. The regulating or mass flow valve 108 can be connected to the control unit 96. For the purpose of sensing the temperature of the intake air in the intake-air line 52 as it enters the mixer 32, the cooling system can comprise a temperature sensor 109. The temperature sensor 109 can be connected to the control device 96. The cooling system 10 can further comprise a sensor 110 disposed in the region of the compression and conditioning system 46, which sensor is set up to acquire a signal that is representative of the capacity utilization state of the compression and conditioning system 46. The sensor 110 can be connected to the control unit 96.

All components described above can be provided in double, for the purpose of redundancy, see FIGS. 1 to 3.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

The invention claimed is:

1. A heat exchanger, comprising:
   at least one cooling segment having a first portion, a second portion and a third portion,
   a first heat carrier flow path, which extends through the first portion of the cooling segment and through which a first heat carrier medium can flow,
   a second heat carrier flow path, which extends through the second portion of the cooling segment and through which a second heat carrier medium can flow,
   a first coolant flow path, which extends through the third portion of the cooling segment and through which a first coolant medium can flow,
   at least one cooling body, and
   at least one second coolant flow path, which extends through the cooling body and through which a second coolant medium can flow,
   the first heat carrier flow path and the second heat carrier flow path being thermally coupled, respectively, to the first coolant flow path and the second coolant flow path, in order to discharge heat energy of at least one of the first heat carrier medium or the second heat carrier medium to at least one of the first coolant medium or the second coolant medium,
   wherein the first portion and the second portion of the cooling segment extend, respectively, in a first plane and in a second plane that is at a distance from the first plane and that extends substantially parallel to the first plane, and wherein the third portion extends in a third plane that is disposed between the first and the second plane and that extends substantially parallel to at least one of the first plane or the second plane, and
   wherein the first heat carrier flow path is split upstream of the first portion into two flow path portions leading respectively into the first plane and second plane and recombined downstream of the first portion, and the second heat carrier flow path is split upstream of the second portion into two flow path portions leading respectively into the first plane and second plane and recombined downstream of the second portion.

2. The heat exchanger according to claim 1, wherein the first portion and the second portion of the cooling segment are designed in such a way that a ratio between a parameter that is characteristic of the heat transfer properties of the first portion and a parameter that is characteristic of the heat transfer properties of the second portion corresponds to a ratio between the heat energy of the first heat carrier medium to be discharged through the first portion, when the heat exchanger is in normal operation, and the heat energy of the second heat carrier medium to be discharged through the second portion, when the heat exchanger is in normal operation.

3. The heat exchanger according to claim 1, wherein the at least one second coolant flow path extends along a flute of a corrugated sheet-type louver fin component of the cooling body.

4. A method for operating a heat exchanger, comprising the steps:
   routing a first heat carrier medium through a first heat carrier flow path, which is split into two flow paths extending through a first portion of a cooling segment of the heat exchanger,
   routing a second heat carrier medium through a second heat carrier flow path, which is split into two flow paths extending through a second portion of the cooling segment of the heat exchanger,
   routing a first coolant medium through a first coolant flow path, which extends through a third portion of the cooling segment of the heat exchanger, and
   routing a second coolant medium through a second coolant flow path, which extends through a cooling body of the heat exchanger,
   recombining the first heat carrier flow path downstream of the first portion,
   recombining the second heat carrier flow path downstream of the second portion,
   the first heat carrier flow path and the second heat carrier flow path being thermally coupled, respectively, to the first coolant flow path and the second coolant flow path, in order to discharge heat energy of at least one of the first heat carrier medium or the second heat carrier medium to at least one of the first coolant medium or the second coolant medium,
   wherein the first portion and the second portion of the cooling segment extend, respectively, in a first plane and in a second plane that is at a distance from the first plane and that extends substantially parallel to the first plane, and wherein the third portion extends in a third plane that is disposed between the first and the second plane and that extends substantially parallel to at least one of the first plane or the second plane, and
   wherein the two flow paths of the first heat carrier flow path lead respectively into the first plane and the second plane, and the two flow paths of the second carrier flow path lead respectively into the first plane and the second plane.

5. The method according to claim 4, wherein, when the heat exchanger is in normal operation, heat energy of the first heat carrier medium is discharged through the first portion of the cooling segment, and heat energy of the second heat carrier medium is discharged through the second portion of the cooling segment, a ratio between the discharged heat energy of the first heat carrier medium and the discharged heat energy of the second heat carrier medium corresponding to the ratio between a parameter that is characteristic of the heat transfer properties of the first portion and a parameter that is characteristic of the heat transfer properties of the second portion.

* * * * *